Sept. 17, 1968 N. W. BURKE 3,402,304
ELECTRICAL DATA PROCESSING APPARATUS
Filed April 23, 1965
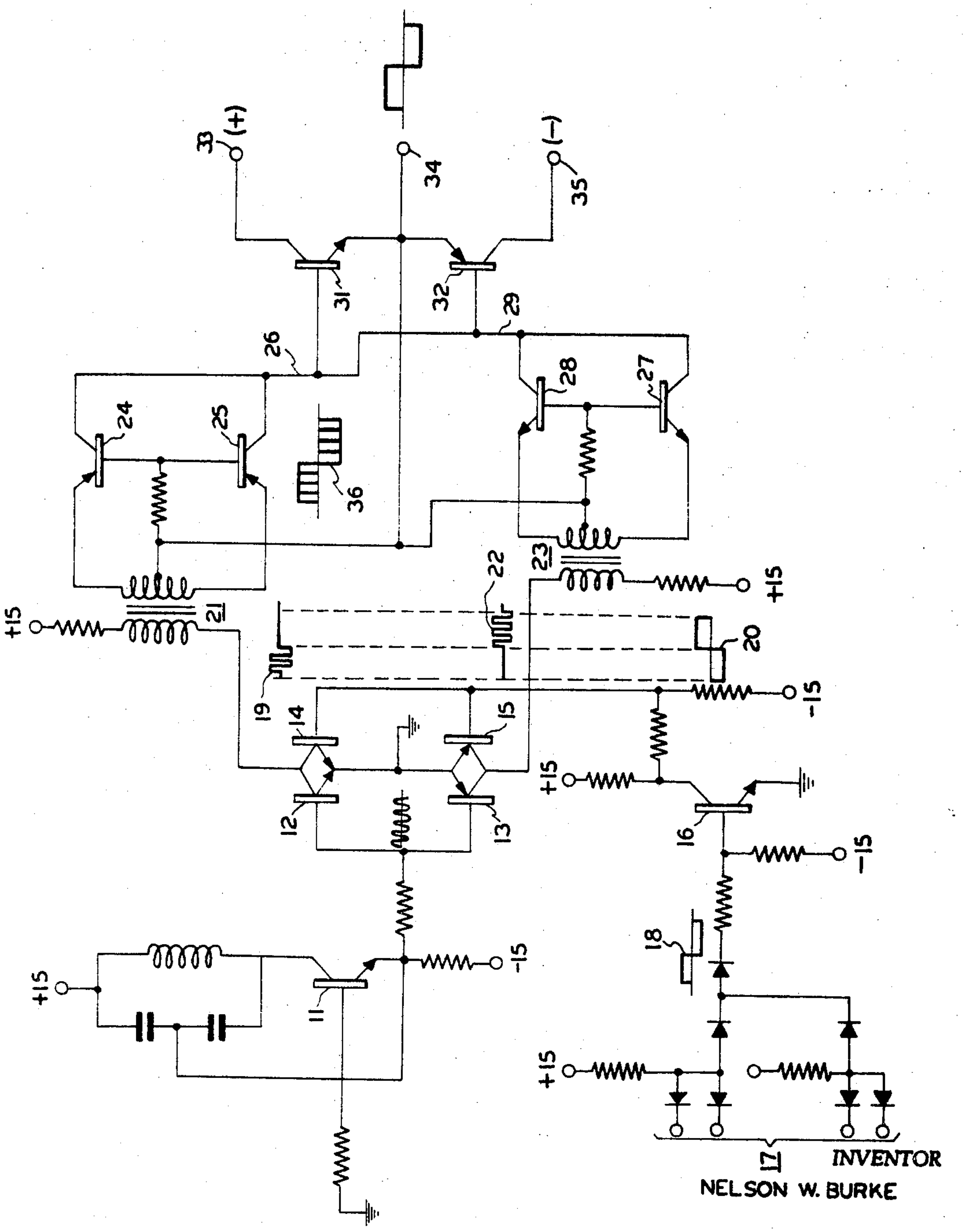
INVENTOR
NELSON W. BURKE
BY Russell, Chittick & Pfund
ATTORNEY United States Patent Office 3,402,304
Patented Sept. 17, 1968

3,402,304
ELECTRICAL DATA PROCESSING APPARATUS
Nelson W. Burke, Stoneham, Mass., assignor to Honeywell Inc., a corporation of Delaware
Filed Apr. 23, 1965, Ser. No. 450,388
5 Claims. (Cl. 307—268)

This invention relates generally to a solid state relay and, more particularly, to an improved solid state relay which is usable in either neutral or polar line communication signalling.

The use of solid state relay circuits for coupling binary data signals from a signal source to a communication line for transmission to a remote point has been provided in the past, such as, for example, the relays shown in the U.S. patents to Tyler, 299,170 and to Pickering et al., 3,148,286. While prior art arrangements such as these have proved satisfactory for particular applications, they have in general been relatively complex and do not provide all of the features that are desirable in modern high speed reliable data communication for data processing systems.

The present invention provides a solid state relay circuit for communication systems and is particularly adapted for use with data processing systems with high speed switching operations characterized by a precise definition of the transition between the so-called mark and space conditions for the two states of the binary signals to be transmitted. The features of the invention are accomplished in a relatively simple manner by a circuit which employs a single transistor oscillator which is continuously operative and a switch circuit which is controlled by the input data to switch the oscillations of the oscillator to two separate transformers. These transformers supply high speed full wave rectification circuits which are coupled to a common point for controlling a transistor switching circuit that is coupled to the output line.

By virtue of this arrangement, an output line including a line rated at relatively high voltages can be controlled by appropriately rated transistors with the application of control signals thereto for either the neutral or polar line be derived from the two full wave rectifiers. Thus the line can be switched into a condition where the control transistor for the line is conductive without the delay incident to time constant circuits which have been characteristic of some of the prior art circuits of this type. When the data goes through a transition and it is desired to make the transistor controlling the output line non-conductive, the circuit of the present invention also provides an affirmative turn-off signal to the conducting transistor so that the data transition on the output line occurs precisely and with high accuracy definition with respect to the actual data being transmitted.

By controlling line transistors without capacitive type time constant circuits in the control signal circuits, extremely high switching rates can be achieved and the device is thus suitable for high quality broad band lines which can operate at high data rates as well be being more precise with respect to data transition times in lower speed data rate applications.

The full wave rectifier circuits provide a sustained signal for maintaining one of the line output transistors conductive in accordance with the data signal and this is accomplished with the aid of the overdriven coupling from the single oscillator which provides sustained control signals without the necessity of using special characteristics in the cores of the coupling transformers or the delaying effect of time constant circuits.

The foregoing objects and features of the invention as well as other particular advantages will be apparent from the following detailed description taken in conjunction with the drawing wherein the single figure shows a schematic wiring diagram for a preferred embodiment of the invention.

Referring now to the drawing, a single transistor 11 is shown connected in an oscillator circuit of the Colpitts type and adapted for continuous operation when the equipment is energized. The frequency of the oscillator 11 is high with respect to the data rate and may conveniently be of the order of 500 kilocycles for ordinary applications.

The output of the oscillator 11 is coupled to two opposite conductivity type grounded emitter transistor switches 12 and 13. These transistors are controlled by corresponding conductivity type transistors 14 and 15 connected in grounded emitter circuit and having their bases connected to the output of an inverter transistor 16. The base of the transistor 16 receives binary input data signals which are to be transmitted with the reception of such signals at the base of transistor 16 controlled by suitable logic, not shown, associated with the data source and applying suitable signals to a set of data and control input terminal 17. For the purpose of describing the invention, two sequential data bits 18 corresponding to a transition from positive to negative will be indicated throughout the circuit at appropriate points. The signal 18 applied to the base of transistor 16 produces an inverted control signal 20 at the bases of the transisor 14 and 15 during the first half of which the collector of transistor 12 is allowed to rise to transmit oscillations 19 to the primary of a transformer 21. Upon the occurrence of the transition in the data input signal 18, the switch 12 turns and the switch 13 turns on to transmit oscillations 22 to the primary of a transformer 23. The oscillations coupled alternately through the switches 12 and 13 are of sufficient amplitude to saturate the transistors thereby producing essentially square wave oscillations 19 and 22 to the primaries of the respective transformers 21 and 23.

The secondary of transformer 21 is connected in a full wave rectifier circuit which employs grounded base PNP transistors 24, 25 and produces a substantially D.C. positive output voltage wave 36 on line 26 throughout the interval that the square wave input voltage 19 is applied to the primary of transformer 21.

In similar manner the secondary of transformer 23 is connected in a full wave rectifier circuit which employs grounded base NPN transistors 27, 28 to produce on output line 29 a substantially D.C. negative voltage wave 36 during the application of the square wave form oscillations 22 to the primary of transformer 23.

The output lines 26 and 29 of the full wave rectifier circuits are actually jointed to a common point which supplies the bases of two complementary conductivity type transistors 31 and 32. The transistor 31 is an NPN type having its collector-emitter path connected from a terminal 33 which is connected to the positive voltage side of a polar communication line and having its emitter electrode connected to a neutral terminal 34 of the polar line. The transistor 32 is a PNP type having its emitter connected to the neutral terminal 34 and its collector connected to a terminal 35 which is connected to the negative voltage side of the polar line.

The operation of the circuit of the invention will now be apparent and hence only briefly reviewed. Binary data signals having transitions from positive to negative and vice versa, such as the signal indicated at 18, are received from a data source connected to the terminal 17. The inverter 16 applies data signals to the control transistors 14 and 15 for switching the oscillations from the oscillator 11 to either the primary of transformer 21 or the primary of transformer 23 as indicated by the signals 19 and 22 respectively. The switching provided by the transistors 12, 13, 14 and 15 is exclusive so that only one transformer at a time is energized.

When transformer 21 is energized, the full wave rectifier circuit produces on line 26 a positive potential for making transistor 31 conductive establishing a mark condition for the polar line connected to terminals 33, 34, 35. When transformer 23 is energized, the full wave rectifier circuit connected to the secondary thereof produces a negative potential on line 29. The negative potential on line 29 acts to make transistor 32 conductive and is effective to render the previously conducting transistor 31 nonconductive with affirmative control of the transition to nonconduction. The same can be said for the transition in the opposite direction since the positive potential on line 26 is effective not only to make transistor 31 conductive but to render transistor 32 nonconductive. Thus precise transitions are obtained with good resolution with respect to the data transitions of the input signal.

The transistors 24 and 25 in the positive voltage full wave rectifier and the transistors 27 and 28 in the negative voltage full wave rectifier are useful in their nonconductive conditions to help maintain a high impedance isolation between the two opposite polarity full wave rectifier circuits. Thus there is no significant loading on the particular rectifier circuit that is producing direct potential to the bases of transistors 31 and 32 and hence losses and cross coupling which would normally be inherent in a circuit without such isolation are not problems in the present circuit.

The absence of capacitance in the full wave rectifier circuits also contributes to the high switching speeds that are attainable with the disclosed device. Since the input signals to the transformers 21 and 23 are substantially square waves, the conduction on alternate half cycles between transistors 24 and 25 when transformer 21 is energized are continuous as indicated by the wave form 36 and the output on line 26 is substantially direct potential. Similar considerations apply for the negative voltage full wave rectifier circuit to maintain a direct potential on output line 29 of negative polarity whenever transformer 23 is energized with the square wave input signal 22.

The present invention is applicable with all of its advantages to a neutral line, i.e., a line which operates with respect to one ground terminal and has only a single polarity between one terminal and ground to designate the binary nature of the transmitted signal. For example, a neutral positive line can be achieved in the disclosed circuit by merely disconnecting the three terminals of transistor 32 and eliminating the negative line terminal 35. For this condition the transistor 31 would switch the terminals 33 and 34 between conductive and nonconductive and the advantages of high speed switching from the unfiltered full wave rectifiers and the affirmative turn-off effect produced during each transition by the opposite polarity imposed as the control potential applied to the base of transistor 31 changes in polarity would obtain. Thus the present invention achieves objectives which have heretofore not been realized in the prior art and does so with an extremely simple and reliable circuit that utilizes relatively few components to accomplish the desired functions.

Modifications of the invention will occur to those skilled in the art in view of the teaching provided herein and such modifications as are within the scope of the appended claims are to be considered as part of the invention.

I claim:

1. A communication line solid state relay for switching a communication line in response to mark and space signals comprising:

(a) a continuously running oscillator,
(b) a pair of transformers,
(c) an output circuit including transistor switch means for switching said communication line,
(d) opposite polarity full wave rectifier circuits respectively connected to the secondary windings of said transformers, the unfiltered outputs of said rectifier circuits being connected to a common control point for switching said transistor switch means in accordance with the polarity of said control point,
(e) two state switching means connected to couple the oscillations of said oscillator exclusively to one or the other of the primaries of said transformers in accordance with a control signal, and
(f) means for generating a binary control signal for said two state switching means in accordance with said mark and space signals.

2. A communication line solid state relay for switching a communication line in response to mark and space signals comprising:

(a) a continuously running oscillator,
(b) a pair of transformers,
(c) an output circuit including a transistor switch having emitter-collector electrodes connected to said line,
(d) opposite polarity full wave rectifier circuits respectively connected to the secondary windings of said transformers, the unifiltered outputs of said rectifier circuits being connected to the base of said transistor for switching said transistor switch in accordance with the polarity of said base,
(e) two state switching means connected to couple the oscillations of said oscillator exclusively to one or the other of the primaries of said transformers in accordance with a control signal, and
(f) means for generating a binary control signal for said two state switching means in accordance with said mark and space signals.

3. A polar communication line solid state relay for switching a communication line in response to mark and space signals comprising:

(a) a continuously running oscillator,
(b) a pair of transformers,
(c) an output circuit including two opposite conductivity type output transistors having their emitter-collector paths serially connected to said line with both emitters connected to the neutral for said line,
(d) opposite polarity full wave rectifier circuits respectively connected to the secondary windings of said transformers, the unfiltered outputs of said rectifier circuits being connected to a common control point which is common to the bases of both of said output transistors for switching said output transistors into opposite states of conduction with the relative state of conduction between said two output transistors determined in accordance with the polarity of said control point.
(e) two state switching means connected to couple the oscillations of said oscillator exclusively to one or the other of the primaries of said transformers in accordance with a control signal, and
(f) means for generating a binary control signal for said two state switching means in accordance with said mark and space signals.

4. A communication line solid state relay for switching a communication line in response to mark and space signals comprising:

(a) a continuously running oscillator,
(b) a pair of transformers,
(c) an output circuit including transistor switch means for switching said communication line,
(d) full wave rectifier circuits respectively connected to the secondary windings of said transformers, each rectifier circuit comprising two grounded base transistors of like conductivity type for rectifying the output of one of said secondary windings with the transistors of one rectifier circuit of opposite conductivity type to the transistors in the other rectifier circuit, the unfiltered outputs of said rectifier circuits being connected to a common control point for switching said transistor switch means in accordance with the polarity of said control point, (e) two state switching means connected to couple the oscillations of said oscillator exclusively to one or the other of the primaries of said transformers in accordance with a control signal, and (f) means for generating a binary control signal for said two state switching means in accordance with said mark and space signals.

5. A polar communication line solid state relay for switching a communication line in response to mark and space signals comprising:

(a) a continuously running oscillator, (b) a pair of transformers, (c) an output circuit including two opposite conductivity type output transistors having their emitter-collector paths serially connected to said line with both emitters connected to the neutral for said line, (d) full wave rectifier circuits respectively connected to the secondary windings of said transformers, each rectifier circuit comprising two grounded base transistors of like conductivity type for rectifying the output of one of said secondary windings with the transistors of one rectifier circuit of opposite conductivity type to the transistors in the other rectifier circuit, the unfiltered outputs of said rectifier circuits being connected to a common control point which is common to the bases of both of said output transistors for switching said output transistors into opposite states of conduction with the relative state of conduction between said two output transistors determined in accordance with the polarity of said control point, (e) two state switching means connected to couple the oscillations of said oscillator exclusively to one or the other of the primaries of said transformers in accordance with a control signal, and (f) means for generating a binary control signal for said two state switching means in accordance with said mark and space signals.

No references cited.

ARTHUR GAUSS, *Primary Examiner.*

J. D. FREW, *Assistant Examiner.*